(12) United States Patent  
Hiraga (10) Patent No.: US 7,165,651 B2  
(45) Date of Patent: Jan. 23, 2007

(54) LUBRICATING STRUCTURE OF AN ENGINE FOR VEHICLE

(75) Inventor: Takashi Hiraga, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 651 days.

(21) Appl. No.: 10/683,657

(22) Filed: Oct. 9, 2003

(65) Prior Publication Data

US 2005/0076731 A1 Apr. 14, 2005

(51) Int. Cl.  
*F01M 1/00* (2006.01)

(52) U.S. Cl. ............... 184/6.12; 184/6.5; 184/11.3; 123/196 R (58) Field of Classification Search ............ 184/6.12, 184/6.5, 11.3, 106; 123/196 R  
See application file for complete search history.

(56) References Cited

U.S. PATENT DOCUMENTS

| | | | | |
|---|---|---|---|---|
| 3,800,913 A | * | 4/1974 | Schmitt ............... | 184/6.13 |
| 5,101,936 A | * | 4/1992 | Paredes et al. ........... | 184/6.13 |
| 6,527,087 B2 | * | 3/2003 | Ito et al. ............... | 184/6.5 |
| 7,040,454 B2 | * | 5/2006 | Kawamoto et al. ........ | 184/106 |
| 2004/0040531 A1 | * | 3/2004 | Yamamoto .............. | 123/196 R |

\* cited by examiner

*Primary Examiner*—David Fenstermacher  
(74) *Attorney, Agent, or Firm*—Alleman Hall McCoy Russell & Tuttle LLP (57) ABSTRACT

A lubricating structure of an engine for vehicle comprising a main pump for pressure-feeding a lubricating oil, and a scavenging pump for pumping the lubricating oil out of a crank room to transfer the oil, can reduce an applied load of a main pump and reduce a power loss of the pump while reducing the size of the main pump and the scavenging pump, and thus reducing the size of the entire engine. In the lubricating structure, the crank room and a transmission room are divided by a partition, an oil storage room communicating with a discharging portion of the scavenging pump is formed, and an oil passage for lubricating a transmission is formed in the transmission shaft along the shaft center and is opened to the oil storage room. The lubricating oil in the oil storage room is supplied to lubrication points on the transmission shaft through the oil passage of the transmission shaft.

7 Claims, 7 Drawing Sheets

LUBRICATING STRUCTURE OF AN ENGINE FOR VEHICLE

BACKGROUND OF THE INVENTION

The present invention relates to a lubricating structure of an engine for a vehicle comprising a main pump which pressure-feeds lubricating oil collected in a transmission room to lubrication points of the engine, and a scavenging pump which pumps the lubricating oil out of a crankcase and is transferred back to the transmission room.

In the lubricating structure of the engine for vehicle comprising the main pump for pressure-feeding lubricating oil and the scavenging pump for transferring the lubricating oil, the scavenging pump functions to maintain the oil level in the crankcase below a predetermined level (about zero) by pumping up the lubricating oil from the crankcase and, for example, transferring it into a transmission room etc. Conventionally, since the lubricating oil collected on the bottom of the crankcase contains many air bubbles, the capacity of the scavenging pump to pump this up is about 1.5 times of the main pump.

The main pump for pressure-feeding the lubricating oil sucks the lubricating oil collected for example, on the bottom of the transmission room through a strainer, pressurizes the lubricating oil to a predetermined pressure, and feeds the pressurized lubricating oil onto a circumference of a crankshaft and to each of the lubrication points within cylinder head(s), while the main pump also feeds the pressurized lubricating oil to the lubrication points in the transmission room.

Since the main pump is designed to pressure-feed the lubricating oil to substantially all lubrication points as mentioned above, the main pump is required to have a pumping capacity that covers all of the required quantity of the lubricating oil. Especially when pressure-feeding the lubricating oil to a fitting portion between a crank pin and a connecting rod through an oil passage formed in the crankshaft, the main pump is required to generate a relatively high oil pressure. Therefore, the oil passage is so constructed that the above-mentioned oil pressure is not reduced by for example, providing a throttle/nozzle in the oil passage within the transmission room.

(1) With the configuration in which the lubricating oil is supplied to the all lubrication points of the engine only by the main pump, since the main pump must be able to supply a sufficient amount of the lubricating oil to the transmission while maintaining the pressure of the lubricating oil which is pressure-fed to the above-mentioned fitting portions such as the circumference of the crankshaft, a large-sized main pump is needed. The large-sized main pump typically has a large driving force, and thus a power loss thereof is also large.

(2) Moreover, the scavenging pump must also be enlarged in its size corresponding to enlargement of the main pump, and enlargement of the entire engine will not be avoided accordingly.

(3) The lubricating oil pumped up from the bottom of the crankcase by the scavenging pump contains many air bubbles, as mentioned above. Since the lubricating oil is sent directly to the transmission room, the main pump sucks the lubricating oil containing many air bubbles and pressure-feeds it to each of the lubrication points. Therefore, it may come to cause generation of cavitation corrosion and wear on sliding surfaces in the main pump.

BRIEF SUMMARY OF THE INVENTION

The scope of the present invention is to reduce an applied load of a main pump, and thus reducing a power loss thereof, while attaining a smaller-sized main pump, scavenging pump, and engine. Moreover, the scope of the present invention is to boost a lubricating performance of the main pump by separating air bubbles from lubricating oil returned to a transmission room.

The present invention has been made with the aim of solving the above conditions, and it is an object of the present invention to provide a lubricating structure of an engine for vehicle which comprises a main pump for pressure-feeding lubrication oil collected in a bottom portion of a transmission room formed in a crankcase of the engine to lubrication points of the engine; a scavenging pump for pumping the lubricating oil out of the bottom portion of a crank room formed in the crankcase wherein the crank room is divided from, or separated from, the transmission room by a partition formed in at least the bottom portion of the crank room, and for transferring the lubricating oil to the transmission room, and wherein the scavenging pump includes a discharging portion; an oil storage room disposed to the side of the transmission room, communicating with the discharging portion of the scavenging pump, and for storing the lubricating oil supplied from the scavenging pump; a transmission shaft arranged in the transmission room such that one end portion of the transmission shaft faces the oil storage room; and an oil passage formed in the transmission shaft, having an opening formed in the one end portion of the transmission shaft so as to open into the oil storage room, and extended from the opening to the lubrication points established on the transmission shaft, wherein the lubricating oil supplied from the scavenging pump and stored in the oil storage room is supplied to the lubrication points on the transmission shaft from the opening formed in the one end portion of the transmission shaft through the oil passage, is dropped from the lubrication points, and then collected in the bottom portion of the transmission room.

By this method, applied load and power loss of the main pump can be reduced, and thus the main pump and the scavenging pump can be reduced in size. Accordingly, the whole engine can also be reduced in size. Moreover, since the lubricating oil once stored in the oil storage room is supplied to the lubrication points on the circumference of the transmission shaft with the centrifugal force by rotation of the transmission shaft, there is no necessity that the scavenging pump itself pressure-feeds the lubricating oil, and this can also prevent a power loss associated with the scavenging pump even if the lubricating oil discharged from the scavenging pump is used for forced lubrication of the transmission.

In order to achieve the above-mentioned operation, in one embodiment, the oil passage may include an oil route which is formed along the axial center of the transmission shaft. Furthermore, in one embodiment, the oil passage may include an oil hole which connects the oil route and the lubrication points on the transmission shaft, and is formed in the transmission shaft in the radial direction.

In the present invention, it is possible to arrange the oil storage room on the side of the transmission room opposite of the clutch which is disposed in either one of end portions of the transmission shaft. Thereby, the empty space of the circumference of the transmission room can be used effectively, and thus the engine can be reduced in size.

In the present invention in which a rod for clutch release operation is inserted slidably in the oil passage axially formed in the transmission shaft, one end portion of the rod is connected with a pressure plate of the clutch, and the other end portion is connected with the clutch operation mechanism, which is arranged in the oil storage room, the rod may be supported through a boss portion and the boss portion may be formed within the oil storage room. Thereby, a direct lubrication to a fitting portion between the rod and the boss portion can be achieved with the lubricating oil in the oil storage room, and thus smooth sliding condition of the rod can be maintained.

In the present invention, the oil storage room may include an exit hole being formed at a position higher than a lowest point of the opening of the transmission shaft which faces the oil storage room and being communicating with the transmission room, and the lubricating oil supplied from the scavenging pump and stored in the oil storage room may be supplied to the transmission room through the exit hole. Thereby, the lubricating oil in the crankcase containing air bubbles is separated into gas and liquid by being stored in the oil storage room and supplied to the transmission room through the exit hole, and thus the lubricating oil can be sucked with the main pump from the transmission room with few air bubbles, and can be supplied to each of the lubrication points. Accordingly, lubricating performance with the main pump can be improved, and it can prevent the generation of cavitation corrosion and wear on sliding surfaces.

In one embodiment of the present invention, the structure further comprising at least one intermediate oil room formed between the oil storage room and the transmission room and communicating with both the oil storage room and the transmission room, wherein the lubricating oil stored in the oil storage room is supplied to the intermediate oil room through the exit hole, and then the lubricating oil is supplied to the transmission room through the intermediate oil room. Thereby, gas-liquid separation of the lubrication oil can be performed on two or more steps and the gas-liquid separation effect is further improved.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiments thereof.

Embodiment 1

Figure 1:
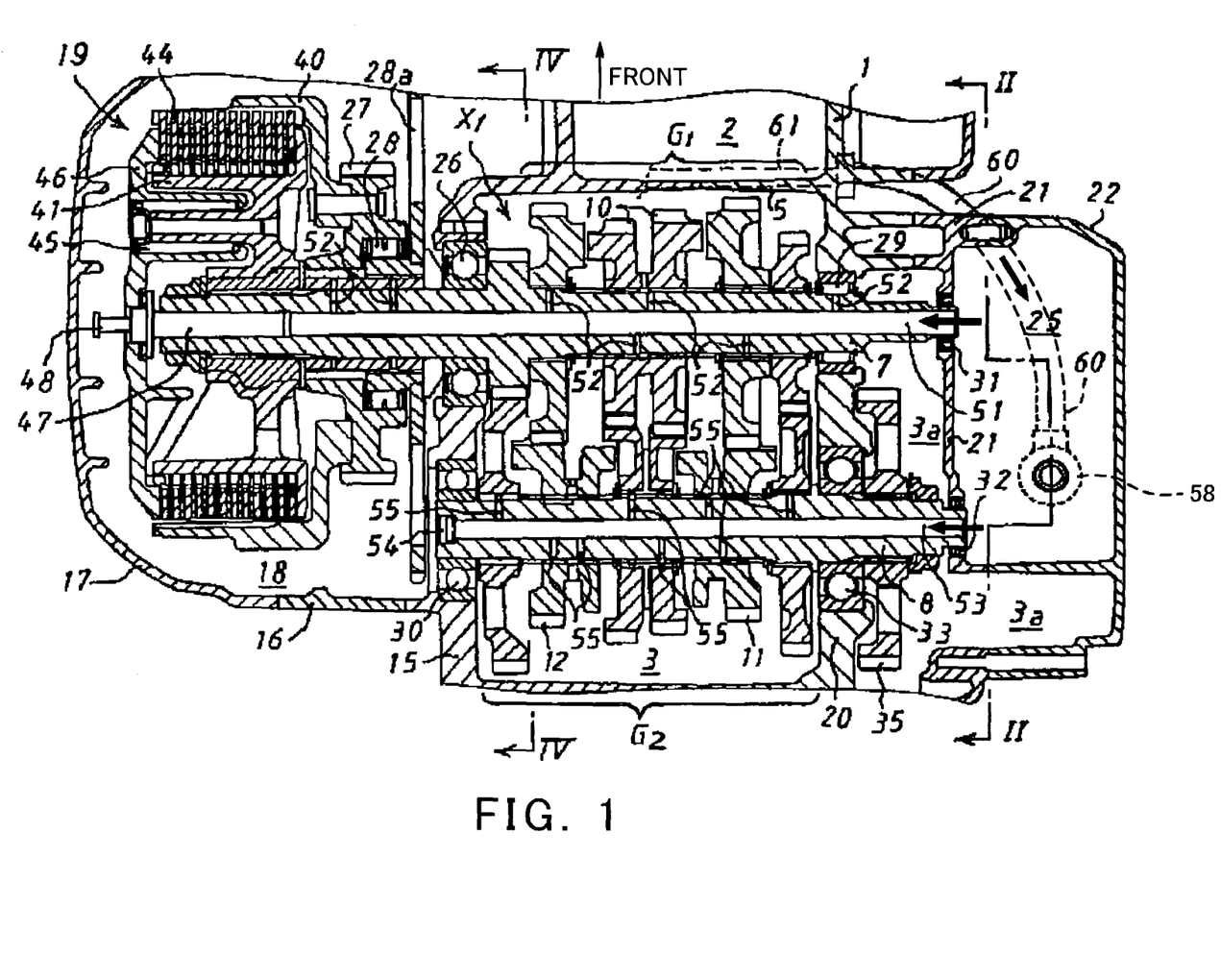
FIG. 1 is a horizontal cross-sectional view of a transmission room of an engine for motorcycles equipped with a lubricating structure according to the present invention (also a cross-sectional view of FIG. 2 along the line I—I)
Figure 2:
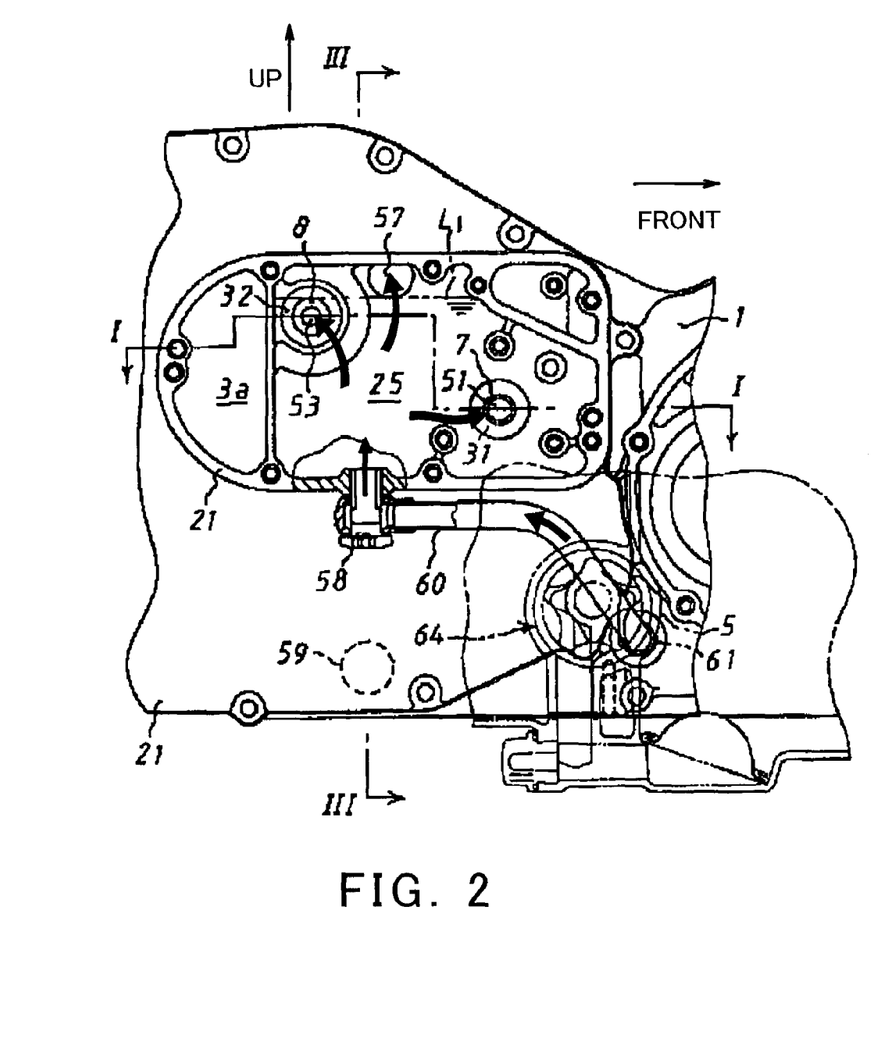
FIG. 2 is a cross-sectional view of FIG. 1 along the line II—II.

[STRUCTURE OF TRANSMISSION] FIG. 1 is a horizontal cross-sectional view of a transmission room of an engine for motorcycles to which the present invention is applied (also a cross-sectional view of FIG. 2 along the line I—I). A crankcase 1 of the engine includes a crank room 2 which accommodates crank pin(s), crank web(s), and the like (not shown), and the transmission room 3. The transmission room 3 is integrally formed in the rear of the crank room 2, and it is divided by a partition 5 from the crank room 2. In this embodiment, the partition 5 is formed at a bottom portion between the crank room 2 and the transmission room 3 extending upwardly from the bottom portion to some extent.

In the transmission room 3, there are an input and output transmission shafts 7 and 8 arranged so as to keep an interval forward and backward and being in parallel with each other. On the outer periphery of each of the transmission shafts 7 and 8, slide-type transmission gears 10, 11, and 12, which constitute transmission gear groups G1 and G2 are rotatably fitted or spline fitted, respectively. By sliding the transmission gears 10, 11, and 12 in the shaft direction by means of shift arms (not shown), it can make a dog clutch mechanism between the transmission gears intermittent and switch to a desired gear ratio.

A first and second clutch covers 16 and 17 are mounted in this order on one side-end wall of the transmission room 3 in the shaft direction; for example, a left end wall 15 of FIG. 1, and thus a clutch room 18 is formed therein. A multi-plate friction clutch 19 is arranged in the clutch room 18. On the other hand, a first and second covers 21 and 22 are mounted in this order on a right end wall 20 of the transmission room 3. An intermediate oil room 3a, which is divided from the transmission room 3 is formed in a space surrounded by the right end wall 20 of the transmission room 3 and the first cover 21 and a part of the second cover 22, and an oil storage room 25 which is divided from the intermediate oil room 3a is formed in a space surrounded by the first cover 21 and the remaining part of the second cover 22.

A left end portion of the input transmission shaft 7 is supported by a left end wall 15 of the transmission room 3 rotatably through a bearing 26, while it extends into the clutch room 18 and the above-mentioned clutch 19 is attached thereto. An input gear 27 is meshed with an output gear on the side of the engine which is not illustrated, and is connected with an idle gear 28a. The idle gear 28a carries out interlocking connection with a starter motor (not shown) through a one-way clutch 28. The right end portion of the input transmission shaft 7 is supported by the right end wall 20 of the transmission room 3 rotatably through a bearing 29, while it passes the intermediate oil room 3a and fits into a supporting hole of the first cover 21 through a seal 31. The right end surface of the input transmission shaft 7 faces the oil storage room 25.

A left end portion of the output transmission shaft 8 is supported by the left end wall 15 of the transmission room 3 rotatably through a bearing 30. The right end portion of the output transmission shaft 8 is supported by the right end wall 20 of the transmission room 3 rotatably through a bearing 33, while it passes the intermediate oil room 3a and fits into a supporting hole of the first cover 21 through a seal 32. The right end surface of the output transmission shaft 8 faces the oil storage room 25. Moreover, an output gear 35 is mounted onto a portion of the output transmission shaft 8 which is located in the intermediate oil room 3a.

[STRUCTURE OF CLUTCH] The clutch 19, which is a well known multi-plate friction clutch, comprising a clutch case 40 coupled with an input gear 27, a hub 41 mounted onto the input transmission shaft 7, a friction plate structure 44 which consists of a number of clutch plates and friction plates, which are alternately arranged between the hub 41 and the clutch case 40, and a pressure plate 46 for pressing the above-mentioned friction plate structure 44 with a clutch spring 45 biasing to the right. A release rod 47 is engaged with the pressure plate 46 and a pull tab 48 is formed on one end portion of the release rod 47 so as to be protrude to the left. Thus, by pulling this pull tab 48 to the left with an actuator (a clutch operation mechanism) which is not illustrated, the pressure plate 46 is moved to the left and the clutch 19 is released. The clutch operation mechanisms may be mechanically or hydraulically operated.

[LUBRICATING STRUCTURE] In FIG. 1, an oil passage 51 is formed in the input transmission shaft 7 penetrating through the shaft-center. The right end of the oil passage 51 is opened to the oil storage room 25 and the left end portion of the oil passage 51 is blocked by the release rod 47 which slidably fits thereinto. In the middle of the oil passage 51, oil holes 52 are formed in the radial direction, each of which communicates with the fitting portions of each transmission gear which constitutes the transmission gear group G1, the bearing 29, and the input gear 27, respectively.

An oil passage 53 is formed in the output transmission shaft 8 penetrating through the shaft-center. The right end of the oil passage 53 is opened to the oil storage room 25, and the left end portion of the oil passage is blocked by a plug 54. In the middle of the oil passage 53, oil holes 55 are formed in the radial direction, each of which communicates with the fitting portions of each transmission gear which constitutes the transmission gear group G2, respectively.

FIG. 2 is a cross-sectional view of FIG. 1 along the line II—II. The input transmission shaft 7 is located at a little lower position from the middle portion of the oil storage room 25 in the vertical direction. The output transmission shaft 8 is located above the input transmission shaft 7. An exit hole (overflow hole) 57 penetrating through the first cover 21 in the shaft direction in the upper end portion of the oil storage room 25 is formed. In this embodiment, the lowest point of the circular opening of the exit hole 57 is positioned higher than the uppermost end of the opening of the oil passage 53 in the output transmission shaft 8. Alternatively, the opening of the exit hole 57 and the opening of the oil passage 53 may be overlapped in the vertical direction.

As shown in FIGS. 1 and 2, one end portion of a lubricating oil pipe 60 is connected with a bottom wall of the oil storage room 25 with a pipe joint bolt 58, and the other end portion of this lubricating oil pipe 60 extends toward the front lower direction, and is connected with a right end exit of an oil passage 61 formed in the partition 5 formed between the crank room 2 and the transmission room 3. The oil passage 61 extends to the left from the right end exit parallel to the shaft direction, and communicates with a discharging portion of the scavenging pump 64 shown by two-dot chain lines. The scavenging pump 64 is arranged at a position, for example near the front end portion of the left end wall 15 of the transmission room 3 (around a position of an arrow XI) in FIG. 1.

Figure 3:
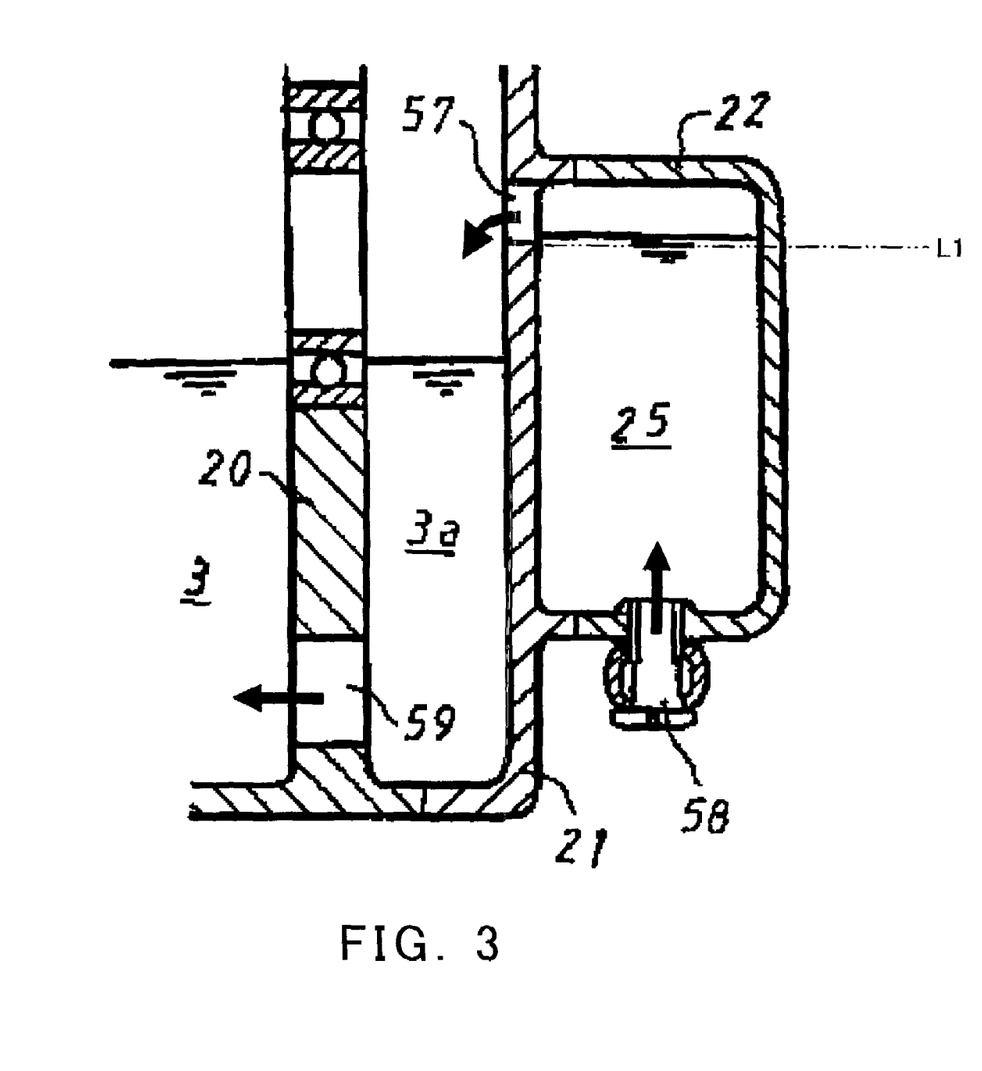
FIG. 3 is a cross-sectional view of FIG. 2 along the line III—III.

FIG. 3 is a cross-sectional view of FIG. 2 along the line III—III. The exit hole 57 formed in the first cover 21 communicates with the intermediate oil room 3a, and the lower portion of the intermediate oil room 3a communicates with the transmission room 3 through a communicating hole 59 formed in the right end wall 20 of the transmission room 3.

Figure 4:
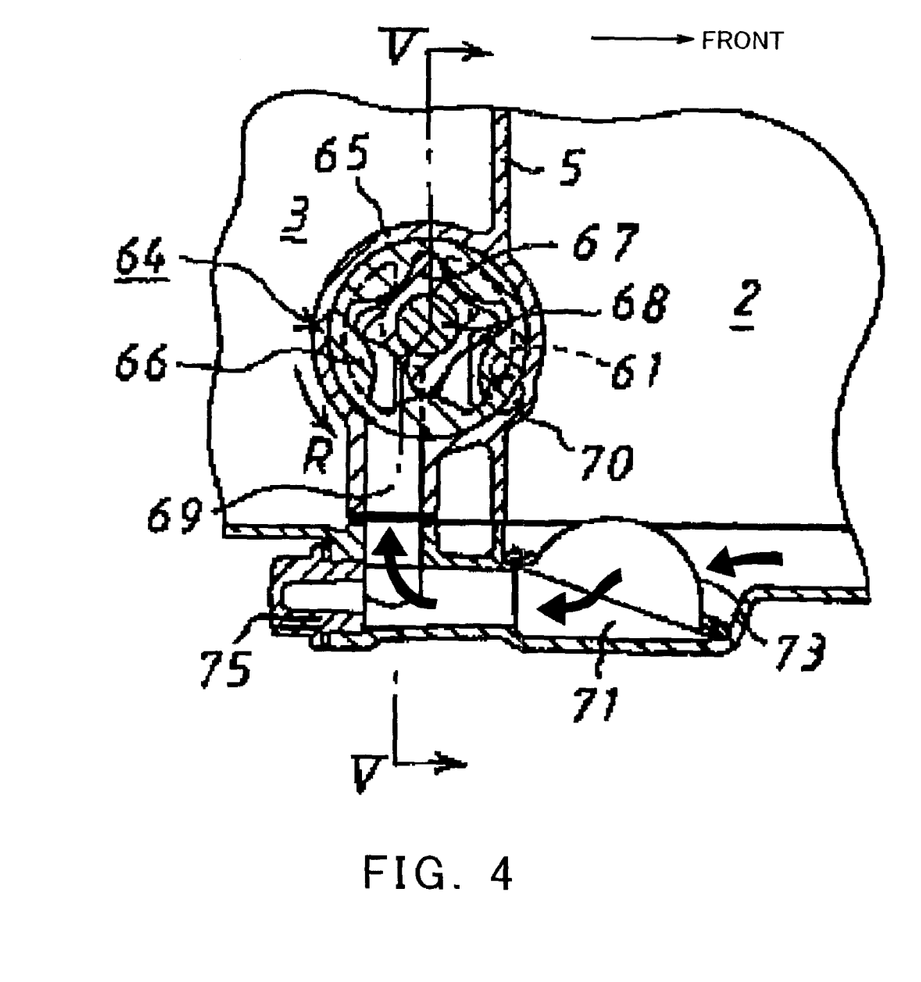
FIG. 4 is a longitudinal cross-sectional view of a scavenging pump corresponding to the IV—IV section of FIG. 1.

FIG. 4 is equivalent to an enlarged partial cross-sectional view of FIG. 1 along the line IV—IV (also a cross-sectional view of FIG. 5 along the line IV—IV), and shows a vertical cross-sectional view of the scavenging pump 64. In FIG. 4, a trochoid-type oil pump is used as the scavenging pump 64. The scavenging pump 64 comprises a casing 65 integrally formed with the partition 5, an external rotor 66 having a circular inner teeth and rotatably fitted inside the casing 65, an internal rotor 67 which contacts internally with the external rotor 66 so as to be eccentric with the external rotor 66, and a pump shaft 68 fixed to the internal rotor 67. A suction passage 69 of the scavenging pump 64 extends below and communicates with an oil discharging portion 71 formed in the bottom wall of the crank room 2. A discharging portion 70 of the scavenging pump 64 communicates with the oil passage 61 in the partition 5, as mentioned above. A bowl-shaped filter 73 is arranged in the oil discharging portion 71, and a drain plug 75 is detachably fitted into a tip-end opening of the oil discharging portion 71.

Figure 5:
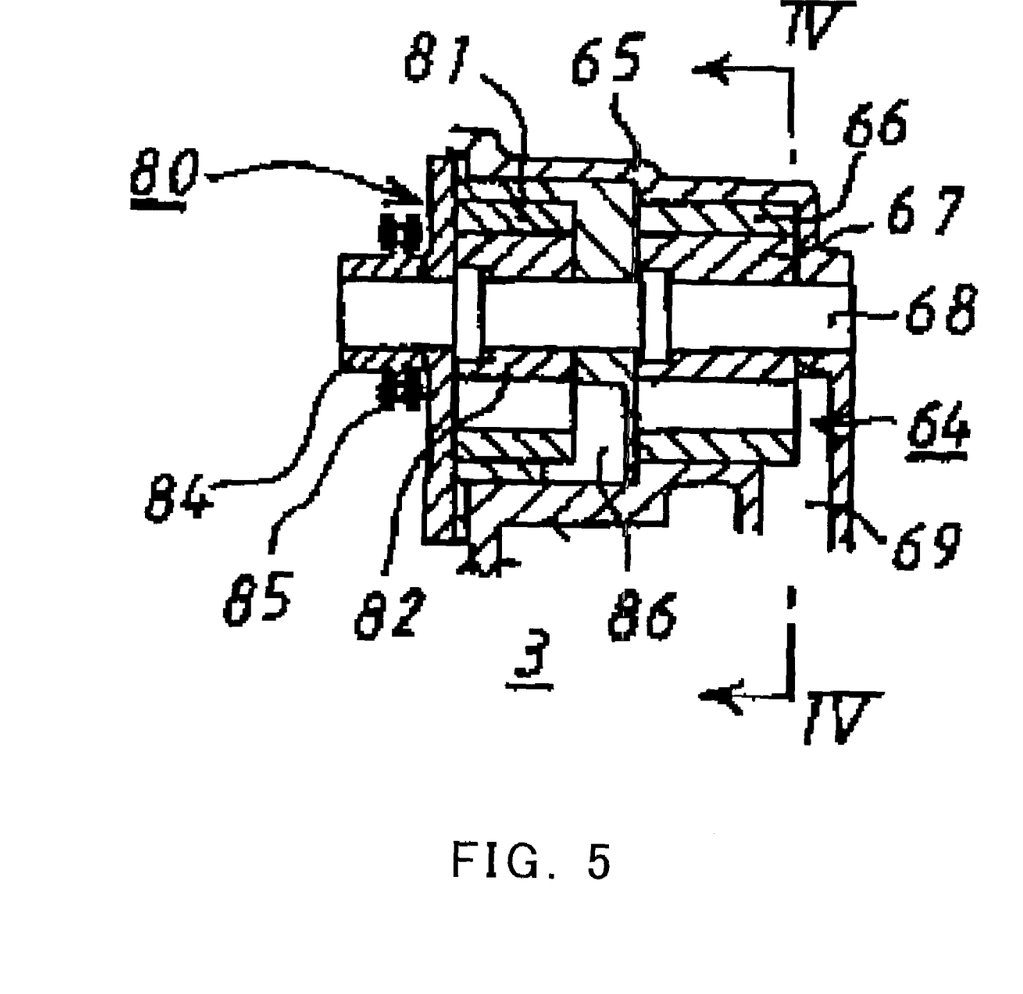
FIG. 5 is a cross-sectional view of FIG. 4 along the line V—V.

FIG. 5 is a cross-sectional view of FIG. 4 along the line V—V. As for the main pump 80 for pressure-feeding the lubricating oil, a trochoid-type oil pump is used, as is the scavenging pump 64. The main pump 80 comprises an external rotor 81, an internal rotor 82, the common pump shaft 68 with the above-mentioned scavenging pump 64, and the casing 65. Pumps 64 and 80 are arranged next to each other on the same axis. A chain sprocket 84 is attached to the common pump shaft 68 and carries out interlocking connection with a drive-side rotational shaft of, such as a balancer shaft (not shown), through a chain 85.

Although the main pump 80 and the scavenging pump 64 include the external rotors 81 and 66 and the internal rotors 82 and 67, having the same diameter, respectively, the scavenging pump 64 is formed wider in the shaft direction than the main pump 80. For example, the width of the scavenging pump 64 in the shaft direction is about 1.4 times larger than the width of the main pump 80 and, thereby a discharging capability of the scavenging pump 64 is also about 1.4 times larger.

A suction passage 86 of the main pump 80 communicates with the bottom portion of the transmission room 3 through a strainer (not shown) etc., and a discharging portion (not shown) communicates with a main oil route (not shown) for lubrication within the crankcase 1. The main oil route for lubrication is branched into two or more oil routes in the middle, and is reached to each of the lubrication points of the engine except the inside of the transmission room 3. For example, although the main oil route for lubrication is not illustrated, it reaches into the fitting portions between the crank pin and the large end portion of the connecting rod and the fitting portions of journals through an oil passage formed in the crankshaft, while it reaches into the intake and exhaust valve operation mechanism etc. through an oil passage of cylinders and cylinder heads.

[OPERATION] With the main pump 80 of FIG. 5, the lubricating oil in the transmission room 3 is, although not illustrated, sucked through a strainer etc. and is discharged from the discharging portion into the main oil route for lubrication by a predetermined pressure. A part of the discharged lubricating oil passes through the oil passage in the crankshaft, and then is pressure-fed to each of the lubrication points on the circumference of the crankshaft such as fitting portions between the crank pins and the large ends of the connecting rods, fitting portions of journals etc. so as to lubricate them, and then is collected in the bottom portion of the crank room 2. The remaining part of the lubricating oil is pressure-fed to each of the lubrication points of the cylinder head, lubricates the intake and exhaust valve operation mechanism etc., and then is collected in the bottom of the crank room 2.

The lubricating oil collected in the crank room 2 is pumped out with the scavenging pump 64 through the filter 73, the oil discharging portion 71, and the suction passage 69 of FIG. 4, and thus an oil level in the crankcase 2 is maintained at about zero.

The lubricating oil sucked into the scavenging pump 64 is transferred from the discharging portion 70 to the right, through the oil passage 61 in the partition 5 of FIG. 1, is supplied to the oil storage room 25 through the lubricating oil pipe 60 from the exit at the right end, and is temporally stored in the oil storage room 25.

In FIG. 2, a part of the lubricating oil stored in the oil storage room 25 flows into the oil passages 51 and 53 in each of the transmission shafts 7 and 8, respectively, is sent through each of the oil holes 52 and 55 of FIG. 1 to the radially outside direction with a centrifugal force by rotation of the transmission shafts 7 and 8, respectively, and is supplied to each of the lubrication points on the circumference of the transmission shaft 7 and 8, respectively. That is, the lubricating oil is supplied to the inner-periphery of the sliding portions (spline-fitting portions) of the slide-type transmission gears 10, 11, and 12, the inner periphery of the bearing metal portions of other transmission gears, a bearing 29, the inner periphery portion of the input gear 27 and the one-way clutch 28 etc., and lubricates them. After lubrication, the lubricating oil is collected in the bottom portion of the transmission room 3.

The lubricating oil collected in the oil storage room 25 of FIG. 2 is separated into gas (air) and liquid (oil) in the oil storage room 25, and the liquid lubricating oil overflows the exit hole 57 into the intermediate oil room 3a as shown in FIG. 3 when the oil level is reached the level L1. Thus, this prevents a pressure increase inside the oil storage room 25.

The lubricating oil overflowed into the intermediate oil room 3a from the exit hole 57 is again separated into gas (air) and liquid (oil) in the intermediate oil room 3a, and then the lubricating oil passes the communicating hole 59 in the right end wall 20 at the bottom of the transmission room 3, and then it is sent into the transmission room 3.

Embodiment 2

Figure 6:
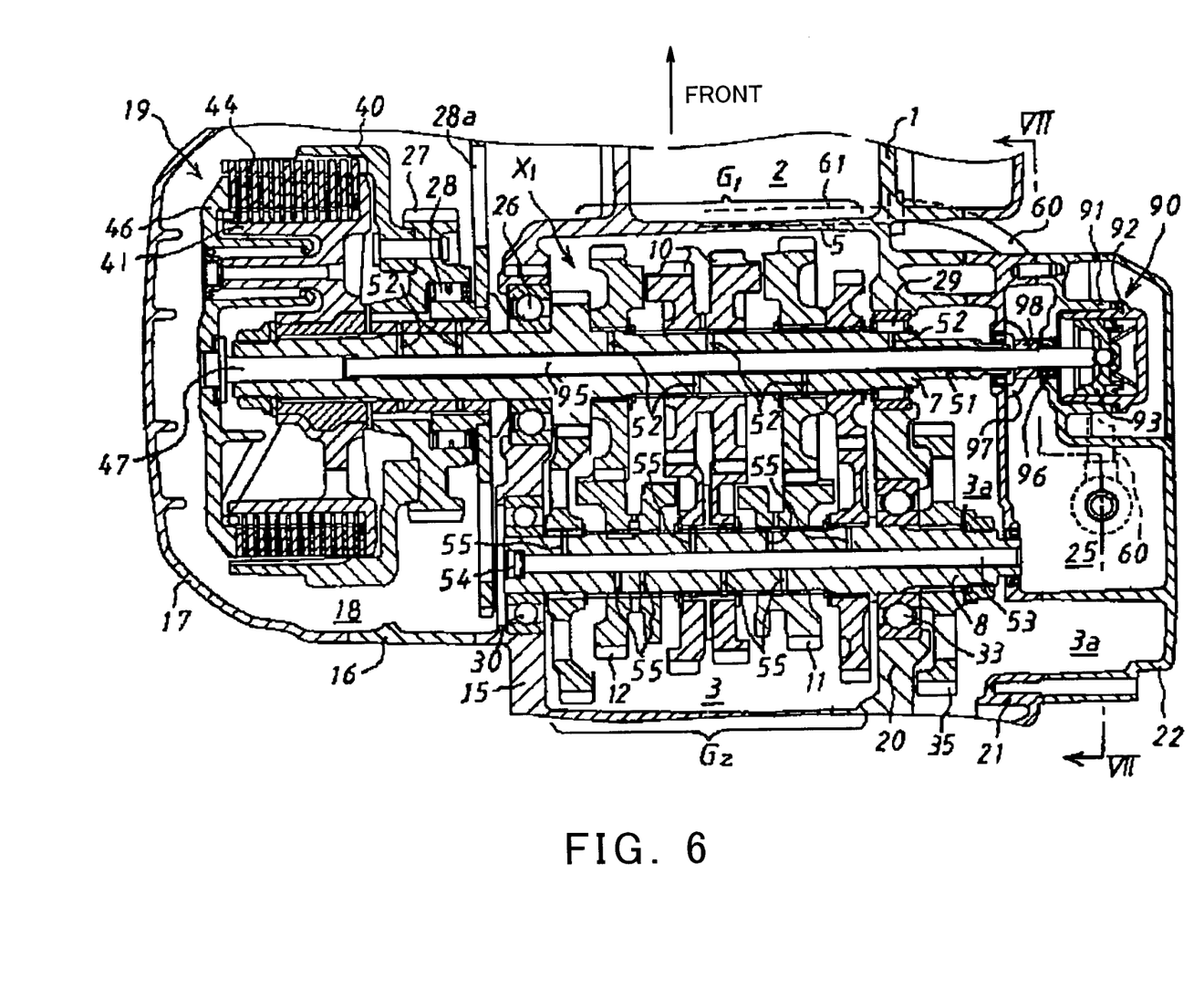
FIG. 6 is a horizontal cross-sectional view of a transmission room of an engine for motorcycles showing another embodiment of the present invention (also a cross-sectional view of FIG. 7 along the line VI—VI)

FIG. 6 shows an example applied to an engine in which the piston-type actuator 90 for clutch operation has arranged on the right-hand side of the transmission room 3. Here, except the release structure of the clutch 19 and structures relevant to the release structure is the same as the structure of FIG. 1, and has given the same reference numerals to the same parts and the same portions.

The release structure of the clutch 19 of this embodiment will be explained briefly hereinafter. An actuator case 91 is formed integrally with the second cover 22, which is arranged at the right-hand side of the transmission room 3. A cylinder 92 is fitted into the actuator case 91, a piston 93 is fitted movably in the right-and-left direction inside the cylinder 92, and a push rod 95 for the release operation is engaged with the piston 93 through a ball. The push rod 95 extends to the left, penetrating the second cover 22 and passing the oil storage room 25, is inserted into the oil passage 51 of the input transmission shaft 7, is further extended to the left so as to leave an annular space between an inside wall of the oil passage 51 and an outer periphery of the push rod 95, and contacts the right end surface of the release rod 47.

When a piston 93 is moved to the left by oil pressure applied in the cylinder 92, the pressure plate 46 is moved to the left through the push rod 95 and the release rod 47, and then the clutch 19 is released.

In the engine equipped with this release operation mechanism, the push rod 95 is fitted into a rod communicating hole of the second cover 22 through a seal 96, a boss portion 98 is formed integrally with the first cover 21 through a leg portion 97 which projects in the oil storage room 25, and the push rod 95 is fitted into and supported by the boss portion 98 slidably in the shaft direction.

Figure 7:
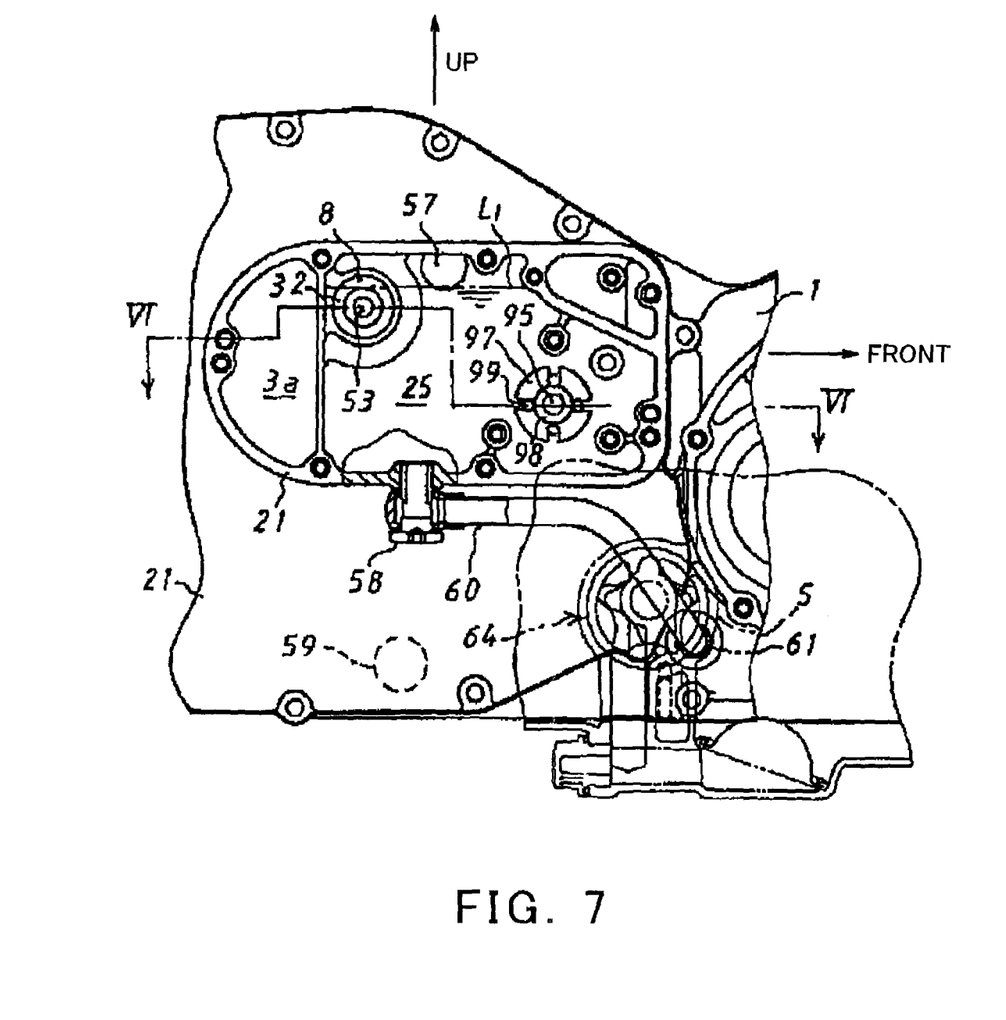
FIG. 7 is a cross-sectional view of FIG. 6 along the line VII—VII.

As shown in FIG. 7, a plurality of end slots 99 (four are shown in FIG. 7) are formed in the leg portion 97 with an equal interval in the circumference direction, and the lubricating oil flows into the oil passage 51 of the input transmission shaft 7 from the oil storage room 25 through these end slots 99.

Since the right end portion of the push rod 95 is supported by the boss portion 98 inside the oil storage room 25, the fitting portion between the push rod 95 and the boss portion 98 is lubricated directly by the lubricating oil in the oil storage room 25, and thus the lubrication can assure the smooth sliding of the push rod 95. In this embodiment, although the hydraulic actuator 90 was illustrated as the clutch operation mechanism, a mechanical clutch operation mechanism may also be utilized.

The present invention is not limited only to the engine for motorcycles, but also is able to apply to an engine for vehicles such as a four-wheeled all-terrain vehicle. Moreover, it is also possible to arrange the oil storage room 25, for example, to the side on which the clutch 19 is arranged. Moreover, as the main pump 80, which pressure-feeds the lubricating oil in each of the lubrication points other than transmission room 3, it is also possible to use various types of gear pumps in addition to the above-mentioned trochoid-type oil pump, and it is also possible to use oil pumps other than the gear pumps. Moreover, as the scavenging pump 64, which transfers the lubricating oil in the crank room 2 to the oil storage room 25, it is also possible to use various types of gear pumps in addition to the above-mentioned trochoid-type oil pump, and it is also possible to use oil pumps other than the gear pumps.

The present invention can still be applied to an engine with which the intermediate oil room 3a as shown in FIG. 3 is not formed. Moreover, it is also possible to form two or more intermediate oil rooms.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

I claim:

1. A lubricating structure of an engine for vehicle, comprising:
   a main pump for pressure-feeding lubrication oil collected in a bottom portion of a transmission room formed in a crankcase of the engine to lubrication points of the engine;
   a scavenging pump for pumping the lubricating oil out of a bottom portion of a crank room formed in the crankcase, wherein the crank room is divided from the transmission room by a partition formed in at least the bottom portion of the crank room, and for transferring the lubricating oil to the transmission room, and wherein the scavenging pump includes a discharging portion;
   an oil storage room disposed to the side of the transmission room, communicating with the discharging portion of the scavenging pump, and for storing the lubricating oil supplied from the scavenging pump;
   a transmission shaft arranged in the transmission room such that one end portion of the transmission shaft faces the oil storage room; and
   an oil passage formed in the transmission shaft, having an opening formed in the one end portion of the transmission shaft so as to open in the oil storage room, and extended from the opening to the lubrication points established on the transmission shaft;
   wherein the lubricating oil supplied from the scavenging pump and stored in the oil storage room is supplied to the lubrication points on the transmission shaft from the opening formed in the one end portion of the transmission shaft through the oil passage, is dropped from the lubrication points, and then collected in the bottom portion of the transmission room.

2. The lubricating structure of claim 1, wherein the oil passage includes an oil route formed along the axial center of the transmission shaft.

3. The lubricating structure of claim 2, wherein the oil passage further includes an oil hole which connects the oil route and the lubrication points on the transmission shaft, and is formed in the transmission shaft in the radial direction.

4. The lubricating structure of claim 3, wherein the oil storage room is arranged on the opposite side of the transmission room from a clutch which is disposed in either one of end portions of the transmission shaft.

5. The lubricating structure of claim 4, further comprising:
   a rod for clutch release operation inserted slidably in the oil passage axially formed in the transmission shaft so as to extend toward the clutch from the one end portion of the transmission shaft, wherein one end portion of the rod is coupled with a pressure plate of the clutch and other end portion thereof is coupled with a clutch operation mechanism which is arranged in the oil storage room;
   wherein the rod is supported through a boss portion which is formed within the oil storage room.

6. The lubricating structure of claim 1, wherein the oil storage room includes an exit hole formed at a position higher than a lowest point of the opening of the transmission shaft facing the oil storage room, and being communicating with the transmission room;
   wherein the lubricating oil supplied from the scavenging pump and stored in the oil storage room is supplied to the transmission room through the exit hole.

7. The lubricating structure of claim 6, further comprising:
   at least one intermediate oil room formed between the oil storage room and the transmission room, and being communicating with both the oil storage room and the transmission room;
   wherein the lubricating oil stored in the oil storage room is supplied to the intermediate oil room through the exit hole and then supplied to the transmission room through the intermediate oil room.

* * * * *